Dec. 22, 1964   A. B. GUNTHEL, JR   3,162,718
JUNCTION UNIT FOR UNDERGROUND ELECTRICAL DISTRIBUTION SYSTEMS
Filed Oct. 15, 1962
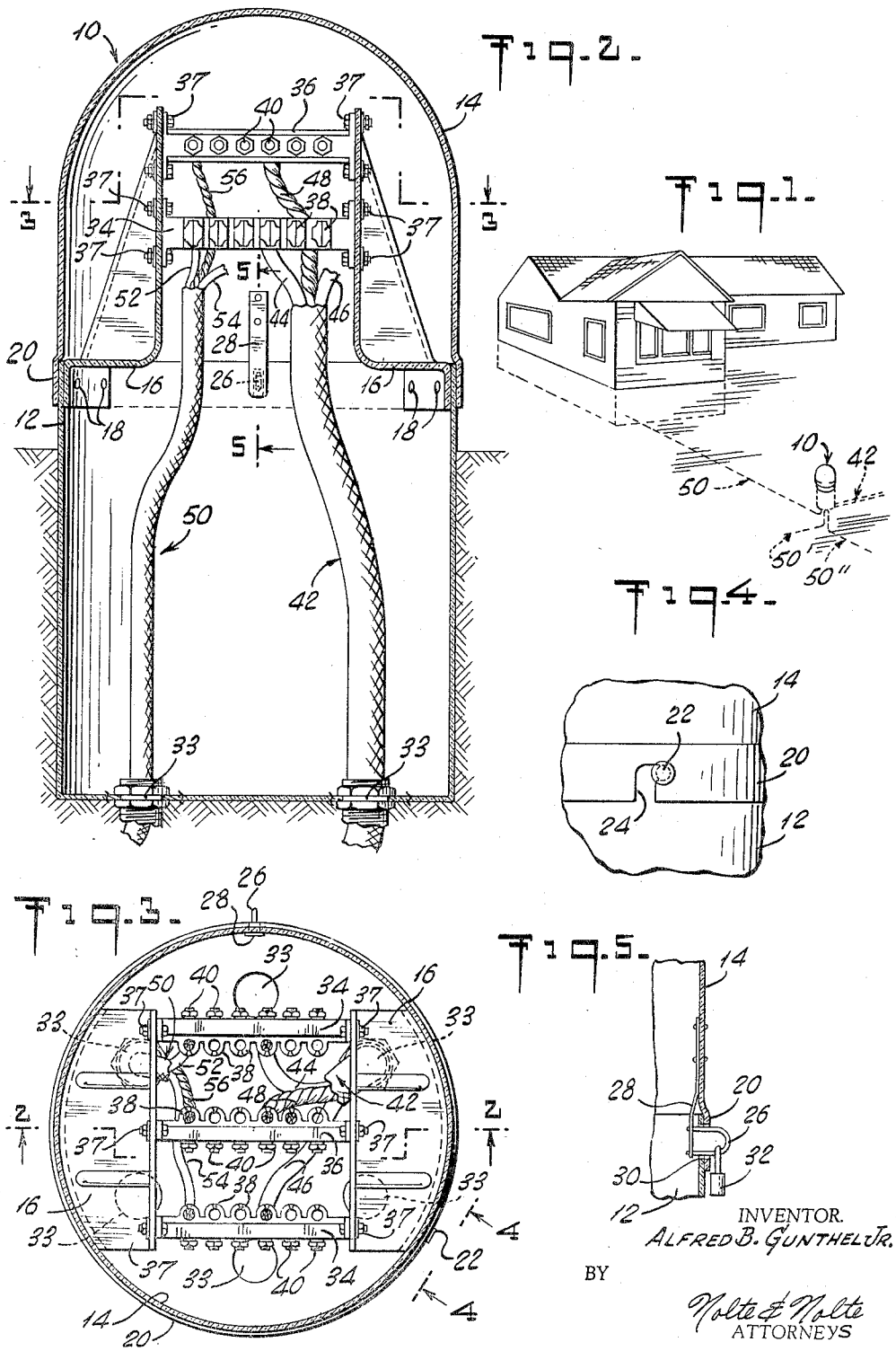
INVENTOR.
ALFRED B. GUNTHEL JR.
BY
Nolte & Nolte
ATTORNEYS

United States Patent Office

3,162,718
Patented Dec. 22, 1964

3,162,718
JUNCTION UNIT FOR UNDERGROUND ELECTRICAL DISTRIBUTION SYSTEMS
Alfred B. Gunthel, Jr., Sea Cliff, N.Y., assignor to Dossert Manufacturing Corp., Brooklyn, N.Y., a corporation of New York
Filed Oct. 15, 1962, Ser. No. 230,523
3 Claims. (Cl. 174—38)

This invention relates to underground electrical distribution systems and more particularly to improvements in junction boxes for use therein.

In the distribution of electricty to a multiplicity of separate services or customers and in particular to residential customers, it is the usual practice to employ the secondary of a distribution transformer as a feeder for one or more customers. The feeder is usually a three wire conductor having two insulated hot legs each 110 volts above the neutral uninsulated third leg to thereby provide the customary secondary voltages of 220 volts between the hot legs or 110 volts between either leg and neutral.

While it has been commonplace to employ the above-described secondary feeder distribution system in above ground installations employing conventional poles and overhead wires, many advantages, such as concealment from the elements, improved appearance, and reduced cost, are to be gained from arranging such a distribution system underground. In such underground systems, it is advantageous to employ a junction unit conveniently located between a plurality of separate services to be supplied with electricity so that the secondary feeder line may be routed to a common point to which the separate services may be connected. The present invention is concerned with a novel and improved construction for a junction unit for such use which employs a cover and a casing of electrically insulating material such as resin impregnated glass fiber which may be suitably recessed into the ground. Bridging the open uppermost portion of the recessed casing are three electrically conductive bus bars to which respectively the neutral and hot legs of both the secondary feeder and the individual service connections are secured. The bus bars are arranged to span the open uppermost portion of the junction unit casing thereby rigidifying the casing walls and at the same time are arranged in parallel and horizontal staircase fashion to provide a maximum terminal separation between the hot legs and the centrally disposed neutral bus bar. The novel arrangement of the bus bars not only braces the walls of the casing, but the casing in turn acts to mount and electrically insulate the conductive bus bars from each other.

In prior art junction units designed for underground wiring systems it has been the practice to construct the exterior thereof of electrically conductive metallic material which necessitated the provision therein of suitable insulators and complex support means therefor to isolate the conductors from the metallic casing. In contrast, applicant's arrangement, by employing an outer casing of insulating material, preferably of a resin impregnated glass fiber construction, may employ conductive bus bars between the walls thereof to effect considerable simplification with improved electrical reliability.

Accordingly, it is the principal object of the invention to provide a junction unit for an underground electrical distribution system incorporating an outer casing of electrically insulating material and inner electrical components which act to rigidify and brace the outer casing.

Another object of the invention is to provide a junction unit of the type described having an improved connection arrangement for the respective electrical conductors.

A still further object of the invention is to provide an underground electrical distribution junction unit having horizontally orientated conductive poles which are readily and easily accessible for conductor clamping purposes.

A still further object of the invention is to provide a junction unit for an underground electrical distribution system not requiring individual insulators.

A still further object is to provide a junction unit casing having a relatively high heat capacity to minimize vapor condensation within the unit.

A still further object of the invention is to provide a junction unit which is simple in design, easily serviced, rugged and weatherproof in construction, inobtrusive in appearance, economical to manufacture, and employing a minimum number of parts.

These and other objects and advantages of the invention will become apparent and the invention will be fully understood from the following description and drawings in which:

FIG. 1 is a perspective view of a typical residential dwelling as supplied by an underground electrical distribution system;

FIG. 2 is a cross-sectional view of the apparatus according to the invention taken along line 2—2 of FIG. 3;

FIG. 3 is a cross-sectional view taken along line 3—3 of FIG. 2;

FIG. 4 is a fragmentary view looking in the direction of the arrows 4—4 of FIG. 3; and FIG. 5 is an enlarged cross-sectional view of the locking means employed between the unit cover and casing.

Referring to the drawings in particular, the invention includes a junction unit generally indicated at 10 having a cylindrical base portion 12 and a domed mating cover portion 14. The cylindrical base 12 is shown in FIG. 2 as having its major portion imbedded beneath the surrounding ground level. The uppermost open mouth of the casing 12 includes a pair of opposed upstanding side brackets 16, which are suitably connected to the inside rim of the casing 12 by rivets 18. The brackets 16 as well as the casing 12 and cover 14 are preferably made of a suitable high strength resin impregnated glass fiber material having high electrical insulation properties. The cover 14 includes a peripheral enlarged rim portion 20 adapted to overlie the diameter of the casing 12 and locate the cover thereover to provide a weatherproof seal. The upper edge of the casing 12 is provided with a fixed pin 22 having an enlarged end portion adapted to engage a corresponding L-shaped slot 24 in the cover 14 (see FIG. 4). This bayonet-type engagement between the pin 22 and slot 24 cooperates with a locking hasp arrangement including an eye 26 affixed to a leaf spring 28 which is in turn riveted to the inner wall portion of the cover 14 (see FIG. 5). The eye 26 protrudes outwardly through aligned apertures 30 in the upper edge of the casing 12 and the lower edge of the rim 20 and is provided with any suitable locking means such as padlock 32 to insure against unauthorized entry to the interior of the junction unit 10.

The bottom of the casing 12 is provided with a plurality of apertures 33 corresponding in number to the number of customers supplied plus one to accommodate the single feeder line. Extending between the upstanding side brackets 16—16 are a pair of live or hot leg connector banks or buses 34—34 on either side of a neutral connector bank 36. Each end of each of the buses 34 and 36 is secured by suitable means such as bolts 37 to the side brackets 16. Each of the buses 34 and 36 is provided with a plurality of clamps 38 held by nuts 40 which are adapted to securely engage the ends of the electrical conductors extending into and out of the junction unit.

As shown in FIG. 1 and FIG. 3, a transformer secondary feeder line 42 enters the casing 12 through one of the apertures 33 in the bottom thereof and is divided into two insulated live legs 44 and 46 and an uninsulated neutral leg 48. The diameter of each feeder conductor is shown larger than the corresponding diameter of the service wires due to their larger current carrying capability. The ends of the live legs 44 and 46 ae connected to the outermost buses 34—34, while the neutral leg is connected to the central and uppermost bus 36. The connection of the three conductors of the feeder 42 in this manner applies the secondary voltage of the distribution transformer to the three conductive buses 34, 36 and 34.

Thereafter, as desired, any number of individual residential services may be connected via underground conduits or cables shown typically as 50, 50′ or 50″ in FIG. 1 to the buses 34, 36 and 34. For instance, the residential service line 50 is shown in FIGS. 2 and 3 as having a pair of live legs 52 and 54 connected to the outer buses 34—34, and a central neutral leg 56 attached to bus 36. While applicant has described a junction unit equipped to connect five residential services to a single feeder line, it should be understood that any number of residential services could be incorporated into applicant's arrangement without departing from the spirit of the invention. Similarly any type of clamping arrangement could be employed for securing each of the terminations of the conductors to the buses 34, 36 and 34, the means shown being only representative of one preferred technique for such purpose. While the buses 34, 36, 34 have been shown in ascending and descending relation, placement thereof upon three different levels in ascending relation would be equally satisfactory.

Thus it can be seen how applicant's arrangement has through very simple means provided a junction unit for an underground electrical distribution system which provides an optimized arrangement of each of the conductors of one potential in a common plane with considerable distance separation from the conductors of a different potential. Furthermore, applicant has advantageously employed the high strength properties of the buses 34, 36 and 34 to rigidify and cooperate with the electrically insulating shell of the junction unit itself to provide an improved low cost design for such purpose.

While a specific embodiment of the invention has been shown and described in detail to illustrate the application of the invented principles, it will be understood that the invention may be embodied otherwise without departing from such principles.

What I claim is:

1. A junction unit for underground electrical distribution systems, comprising a hollow casing of electrically non-conductive material adapted to extend into the ground and having an open top end, said hollow casing having a wall formed with a plurality of openings passing therethrough, a pair of electrically non-conductive brackets fixedly carried by said casing adjacent said open top thereof and extending upwardly beyond said open top of said casing and defining a predetermined space between themselves, a plurality of elongated buses spaced from each other and extending across said space between said brackets, said buses being respectively fixed at their ends to said brackets and being supported exclusively by said brackets and also reinforcing said brackets by lending rigidity thereto, means carried by each of said buses for electrically connecting thereto a plurality of electrical conductors which extend into said hollow casing through said openings thereof, and a hollow cover made of electrically non-conductive material and having an open bottom end engaging said open top end of said casing, said brackets and buses being situated in the interior of said cover when the latter is mounted on said casing.

2. A junction unit for underground electrical distribution systems, comprising a lower cylindrical casing of electrically non-conductive material adapted to extend into the ground and having a bottom wall formed with a plurality of openings passing therethrough, said casing having an open top end, a pair of brackets respectively having lower outer peripheral portions extending along the inner surface of said casing at said top end thereof and fixed thereto, said brackets extending at lower portions thereof inwardly from the periphery of said casing, at said top end thereof, toward each other and said brackets having a pair of upstanding walls extending upwardly from said inwardly extending lower portions thereof, respectively, and facing each other, a plurality of buses extending between and fixed at their end to said upstanding walls of said brackets, said walls of said brackets forming the only support for said buses and said buses by extending between and being fixed to said brackets reinforcing the latter by lending rigidity thereto, means carried by each of said buses for fixing thereto electrical conductors which extend into said casing through said openings in said bottom wall thereof, and a hollow, dome-shaped cover of electrically non-conductive material having a closed position surrounding said brackets and buses and engaging with an open bottom end thereof the open top end of said casing, so that when said cover is removed from said casing said buses are readily accessible at an elevation higher than said casing.

3. A unit as recited in claim 2 and wherein there are three buses including two outer buses and an intermediate bus therebetween, said outer buses being located substantially at the same elevation and said intermediate bus being located at an elevation higher than said outer buses.

References Cited in the file of this patent
UNITED STATES PATENTS

| | | |
|---|---|---|
| 279,646 | Hamilton | June 19, 1883 |
| 332,319 | Barrett | Dec. 15, 1885 |
| 2,414,575 | Windsor | Jan. 21, 1947 |
| 2,545,898 | Schmitt | Mar. 20, 1951 |
| 2,967,287 | Sori | Jan. 3, 1961 |
| 3,033,912 | Philips | May 8, 1962 |
| 3,055,970 | Handley | Sept. 25, 1962 |